US012582985B2

(12) United States Patent
Yang et al.

(10) Patent No.: US 12,582,985 B2
(45) Date of Patent: Mar. 24, 2026

(54) SAMPLE-IN-RESULT-OUT CLOSED MICROFLUIDIC DEVICE FOR NUCLEIC ACID MOLECULAR POINT-OF-CARE TESTING DETECTION

(71) Applicant: City University of Hong Kong, Hong Kong (CN)

(72) Inventors: Mengsu Yang, Hong Kong (CN); Bereket Ayele, Hong Kong (CN); Renardi Gunawan, Hong Kong (CN)

(73) Assignee: City University of Hong Kong, Hong Kong (CN)

(*) Notice: Subject to any disclaimer, the term of this patent is extended or adjusted under 35 U.S.C. 154(b) by 739 days.

(21) Appl. No.: 17/816,769

(22) Filed: Aug. 2, 2022

(65) Prior Publication Data

US 2024/0042432 A1 Feb. 8, 2024

(51) Int. Cl.
*B01L 3/00* (2006.01)

(52) U.S. Cl.
CPC ... *B01L 3/502715* (2013.01); *B01L 3/502738* (2013.01); *B01L 3/502784* (2013.01); *B01L 3/523* (2013.01); *B01L 2200/10* (2013.01); *B01L 2200/16* (2013.01); *B01L 2300/087* (2013.01); *B01L 2300/1805* (2013.01); *B01L 2400/0406* (2013.01)

(58) Field of Classification Search
None
See application file for complete search history.

(56) References Cited

U.S. PATENT DOCUMENTS

| | | | | | |
|---|---|---|---|---|---|
| 6,153,425 | A | * | 11/2000 | Kozwich | B01L 3/502 435/306.1 |
| 6,818,452 | B2 | | 11/2004 | Wong | |
| 8,415,141 | B2 | | 4/2013 | You et al. | |
| 8,772,017 | B2 | | 7/2014 | Battrell et al. | |
| 9,791,437 | B2 | | 10/2017 | Egan et al. | |
| 11,268,142 | B2 | | 3/2022 | Dejohn et al. | |

(Continued)

FOREIGN PATENT DOCUMENTS

| | | | | | |
|---|---|---|---|---|---|
| CN | 107923923 | A | * | 4/2018 | G01N 35/1079 |
| EP | 3427830 | B1 | | 6/2021 | |
| WO | WO-2018105302 | A1 | * | 6/2018 | C12Q 1/6844 |

OTHER PUBLICATIONS

Zhou, Y., Wu, Y., Ding, L., Huang, X., & Xiong, Y. (2021), "Point-of-care COVID-19 diagnostics powered by lateral flow assay," Trends in analytical chemistry: TRAC, Dec. 2021; 145: 116452. (https://doi.org/10.1016/j.trac.2021.116452).

(Continued)

*Primary Examiner* — Matthew D Krcha
(74) *Attorney, Agent, or Firm* — S&F/WEHRW

(57) ABSTRACT

A molecular point-of-care testing (POCT) diagnostic device for molecular detection of various diseases with "sample-in-result-out" principle is provided. The device has a sample tube in which a test sample is mixed with a sample buffer, a microfluidic-based reaction tube with a simple flow-based system for amplifying the sample buffer mixed with the test sample to form an amplified result, and a closed-system, disposable result interpretation using colorimetric- or lateral flow assay-based for assaying the amplified result. The device is portable and simple to use, which can help bring laboratory detection to the field.

11 Claims, 18 Drawing Sheets

(56) References Cited

U.S. PATENT DOCUMENTS

| | | | | |
|---|---|---|---|---|
| 2009/0105082 | A1* | 4/2009 | Chetverin ................ | C12Q 1/68<br>506/40 |
| 2019/0056391 | A1 | 2/2019 | Deirmengian et al. | |
| 2019/0126270 | A1* | 5/2019 | Linnes ................... | C12Q 1/703 |
| 2020/0254443 | A1 | 8/2020 | Zhang et al. | |

OTHER PUBLICATIONS

Koczula, K. M., & Gallotta, A. (2016), "Lateral flow assays," Essays in biochemistry, 60(1), 111-120. (https://doi.org/10.1042/EBC20150012).

Welch, N.L. et al., "Multiplexed CRISPR-based microfluidic platform for clinical testing of respiratory viruses and Identification of SARS-CoV-2 variants," Nature Medicine, vol. 28, pp. 1083-1094 (2022). (https://doi.org/10.1038/s41591-022-01734-1).

* cited by examiner

SAMPLE-IN-RESULT-OUT CLOSED MICROFLUIDIC DEVICE FOR NUCLEIC ACID MOLECULAR POINT-OF-CARE TESTING DETECTION

FIELD OF THE INVENTION

This invention relates to a POCT device that can replace laboratory diagnosis to screen a specific disease in a rapid manner, easily distributed and independently operated by people without extensive lab experience.

List of Abbreviations

COVID-19 Coronavirus disease 2019
LFA Lateral flow assay
POCT Point-of-care testing
PTFE Polytetrafluoroethylene

BACKGROUND

Since the start of COVID-19 pandemic, billions of people in the entire world have been affected with the widespread lockdown, overburdened medical system, and long queues of COVID-19 testing. It exposes the unreadiness of most medical systems in the world in the wake of a significant pandemic, including in the overburdened diagnostic testing labs. A high volume of clinical samples puts heavy strains on laboratories, causing a delay in analyzing the samples and issuance of results. Such delay is almost a global occurrence throughout the COVID-19 pandemic.

The severity of COVID-19 displays the importance of a "bedside" diagnostic kit, which is known as POCT. Such test enables delivering of the test directly to a patient, providing an alternative for a standard diagnostic test, and relieving the burden on testing labs. Additionally, a rapid self-testing kit can help in monitoring the spread of an infectious disease and is suitable for field use in a remote area or in a situation favorable for controlling disease spread. Reports on new technologies for COVID-19 are promising for POCT use, but further developments are needed (Pedrosa et al., 2022; Welch et al., 2022).

A disadvantage of POCT devices for disease diagnosis is that they target on a specific portion of the disease-causing agents, or presence of antibody towards the agents. However, kits that achieve these two targets are often not sensitive, due to reliance on the existing number of agents, or through indirect detection. Molecular-based testing, however, can amplify the nucleic acid component of the agents to a higher number, allowing a higher sensitivity to detect a lower amount of agents, and can detect the presence of the agents directly. Despite the better sensitivity, the amplification step requires enzymatic reaction and controlled heating, both of which remain as a major disadvantage of molecular-based testing for POCT.

Additionally, molecular-based testing has a major risk of contamination by the amplified products. Diagnostic tests in the lab use closed tubes, and are performed by professionals in a controlled environment, which limits the chance of contamination. You et al. (2013) disclose a system to prevent contamination, though the device is meant for end-point test, making it unsuitable for POCT. On the other hand, Battrell et al. (2014) disclose an intricate microfluidic device designed for nucleic acid assay. The microfluidic device could perform a test in simplified manner, but is still limited to lab-trained users. As a self-test POCT is not always operated by a professional or performed in an environment suitable for molecular tests, these things need to be addressed before a molecular-based POCT is suitable for this designated use. Furthermore, molecular tests involve laborious steps, such as mixing, adding a certain volume of liquid, centrifuging, or other steps. U.S. Pat. No. 9,791,437, for example, discloses a system with capabilities in detecting influenza virus and differentiating it based on the subtypes with simple working steps. However, the assay needs bulky machine and trained personnel to operate. To make a molecular based POCT, these steps should be simplified to make the device user-friendly.

Another disadvantage of molecular-based testing is the need for a reliable way of interpreting results without relying on laboratory machines. Molecular diagnostic tests involve complex mechanism result interpretation, and in most of the cases require expensive or bulky instrumentation, making it not feasible for POCT. For example, an assay equipment reported by Egan et al. (2017) demonstrates capability to detect numerous biological substances, including some pathogenic diseases, but is still reliant on bulky devices for interpreting the result.

LFA strips are a simple and cheap method to interpret numerous biological test results. LFA can detect various objects in a sample, for example antibodies, antigens, proteins or nucleic acid depending on the recognition elements. LFA strips have been widely used in POCT devices due to the economical feature and portability of the LFA strips, providing versatile rapid primary screening of pathogens without additional sophisticated equipment and being suitable for use in lab or field applications. Furthermore, the recent COVID-19 pandemic has increased LFA applications in diagnostics due to the LFA's reliability, accessibility to the public, and portability. Therefore, LFA-based POCT could provide an alternative for rapid, equipment-free portable tests without requiring professional training to use (Zhang, 2020; Deirmengian, 2018; Wong, 2019; Koczula and Gallotta, 2016; Zhou et al., 2021).

In view of the problems as elaborated above, there is a need for a POCT device with sensitivity of a molecular-based testing as well as being simple, inexpensive, disposable, suitable for rapid deployment in the field and for distribution to non-medical trained persons for self-testing, and easy to interpret without depending on laboratory devices. Several POCT devices available in the market still utilize complex or bulky devices, require a central lab for operation, or have relatively high costs. It inhibits mass deployment of these devices (Dejohn et al., 2022; Kayyem et al., 2013).

SUMMARY OF THE INVENTION

The present invention provides a highly integrated POCT platform for rapid detection of various diseases with simple operation, portable and compatible for field applications. In principle, the present invention works with a "sample-in-result-out" system, providing a closed system to prevent contamination to the environment. Specifically, the present invention provides a portable, one-time-use, room-temperature stable, self-standing diagnostic device with a simplified operation protocol and multiple result interpretations, such as, but not limited to, colorimetric change or LFA-based detections.

Disclosed herein is a molecular POCT diagnostic device for assaying a test sample. The device comprises a sample tube, and a microfluidic-based reaction tube. The sample tube is used for receiving the test sample, the sample tube including a sample buffer for mixing with the test sample.

The microfluidic-based reaction tube is insertable into the sample tube for receiving the sample buffer that is mixed with the test sample. The reaction tube includes one or more reaction chambers. An individual reaction chamber is arranged to receive a portion of the received sample buffer. The individual reaction chamber includes an amplification reagent for amplifying a test-sample content in the received portion to yield an amplified result used for assaying the test sample. The reaction tube is configured to lock and seal the reaction tube and the sample tube together to create a closed enclosure confining the sample buffer for advantageously avoiding contamination of the sample buffer from outside the sample tube and the reaction tube during generation of the amplified result.

Preferably, the device further comprises an inner tube configured to connect to the reaction tube such that the reaction tube receives the sample buffer from the sample tube via the inner tube. The inner tube is housed inside the sample tube when the reaction tube connected with the inner tube is inserted into the sample tube. Furthermore, the inner tube comprises an inner-tube opening and a filter. The inner-tube opening is used for receiving the sample buffer from the sample tube. The filter is proximal to the inner-tube opening for filtering the sample buffer before the sample buffer reaches the reaction tube to thereby prevent possible cell debris from entering into the reaction tube.

Preferably, the reaction tube further includes a first O-ring for locking and sealing the reaction tube and the sample tube to create the closed, airtight enclosure with positive pressure within when the reaction tube is inserted into the sample tube, the first O-ring being located at a lateral side of the reaction tube.

Preferably, the one or more reaction chambers are installed at a first end portion of the reaction tube. The individual reaction chamber is installed with a capillary tube used for transporting the portion of the received sample buffer from a second end portion of the reaction tube to the individual reaction chamber. The second end portion is opposite to the first end portion.

Preferably, the capillary tube is configured to limit an amount of sample buffer flowable into the individual reaction chamber.

In one embodiment, the capillary tube is sealed with a heat-sensitive valve, the heat-sensitive valve being openable when exposed to heat.

In one embodiment, the individual reaction chamber is further installed with a channel connecting the individual reaction chamber to the second end portion of the reaction tube, where the capillary tube is positioned inside the channel. A centrally-open plug is embedded into the channel. The centrally-open plug covers the channel and allows the capillary tube to go through the channel so as to prevent uncontrolled spill of the sample buffer into the individual reaction chamber while allowing the portion of the received sample buffer to enter into the individual reaction chamber.

In one embodiment, the one or more reaction chambers consist of four respective reaction chambers such that four respective channels are installed in the device. In addition, the four respective channels are arranged in an X shape.

In one embodiment, the individual reaction chamber comprises a silicone seal enclosing a junction between the individual reaction chamber and the channel for sealing the junction.

In one embodiment, the reaction tube further includes a second O-ring located at a lateral side of the reaction tube for locking and sealing the reaction tube and the inner tube when the reaction tube is connected to the inner tube.

In one embodiment, the reaction tube further includes a crevice gap located between the first and second O-rings for exposing respective channels installed for the one or more reaction chambers to outside the reaction tube, to allow pressure stabilization when the tubes are closed. Additionally, one or more holes are formed on the channel at the crevice gap for displacing air in the individual reaction chamber during transfer of the sample buffer.

In one embodiment, the amplification reagent is a dried amplification reagent.

In one embodiment, the one or more reaction chambers consist of four respective reaction chambers.

Preferably, the device further comprises a reading cassette for assaying the amplified result. The reading cassette comprises a main body, a LFA strip, a puncturing blade and a glass fiber. The main body is formed with a hollow tube used for receiving the reaction tube. The LFA strip housing is used for housing a LFA strip used to perform LFA. The puncturing blade is located at the hollow tube for rupturing the one or more reaction chambers when the reaction tube is inserted into the hollow tube, thereby releasing the amplified result from the one or more reaction chambers. The glass fiber connects the puncturing blade and the LFA strip housing for transporting the released amplified result to the LFA strip such that the test sample is assayed.

In one embodiment, the one or more reaction chambers consist of four respective reaction chambers. The puncturing blade is shaped as a 4-point wide barbed arrowhead such that all the four respective reaction chambers are ruptured when the reaction tube is inserted into the hollow tube.

Preferably, the device further comprises a heating block for heating the reaction tube.

Preferably, the heating block comprises two sets of cavities, one for insertion of sample tube and the other one for inserting the one or more reaction chambers, preferably arranged as one big cavity for the sample tube, and four smaller cavities for the reaction chambers. As both cavities are located in the same block, it allows sample treatment and amplification reaction to be performed in the same heating block.

In the heating block, the bottom part of the cavities for the reaction tube may be hollow and a camera may be installed nearby said bottom part, in case that colorimetric-based result reading is used. The camera records the color change consistently since the reaction starts for allowing real-time measurement. Other aspects of the present disclosure are disclosed as illustrated by the embodiments hereinafter.

The foregoing paragraphs have been provided as general introduction, and not intended to limit the scope of the following claims. Further modifications, revisions, changes or future versions may be made to the illustrated design displayed herein without deviating from the reasonable interpretation of the written claims.

Skilled artisans will appreciate that elements in the figures are illustrated for simplicity and clarity and have not necessarily been depicted to scale.

DETAILED DESCRIPTION

The present invention detailed herein is related to a disposable device for pathogen screening in a closed environment, with the "sample-in-result-out" principle to avoid getting a false positive result due to contamination of amplification products or biological sample, in-built passive liquid transfer system, simplified protocol, and visual-based result interpretation for disease screening by non-trained personnel. The disposable device contains all necessary parts for detecting specific pathogens on a nasal swab through isothermal reaction, and can be operated by an ordinary person without a need for first receiving laboratory training. Briefly speaking, in the disposable device, a sample tube filled with a sample buffer is connectable to a reaction tube containing dried reagents and a passive fluid transporting mechanism. The disposable device is designed in such a way to facilitate sample buffer transfer to wet the dried reagents in a consistent volume. A tube breaking mechanism in a closed reading cassette is used to break the reaction tube and transfer the liquid to a LFA strip, by which the assay result is displayed.

The present invention will be described more in detail hereinafter supplemented with accompanied figures. However, this invention can be embodied in many different forms and should not be limited to described embodiments herein. The technical illustrations described herein are for descriptive purposes and shall not be construed as limiting the claims.

Figure 1:
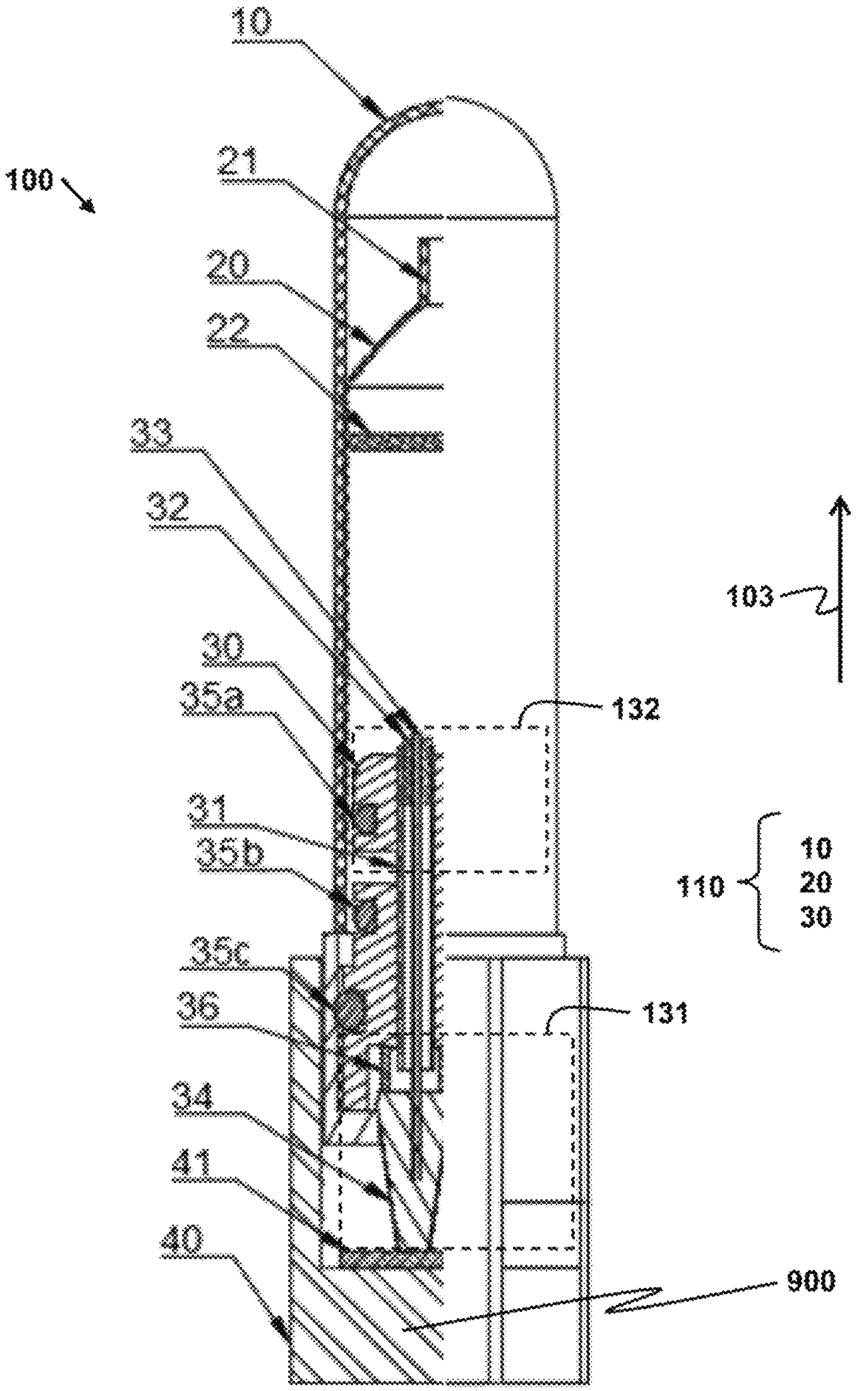
FIG. 1 depicts, in accordance with an exemplary embodiment of the present invention, a molecular POCT diagnostic device under a half-sectional perspective, where the device comprises a sample tube, an inner tube, a microfluidic-based reaction tube and a reading cassette.

The disposable device as disclosed herein is a molecular POCT diagnostic device for assaying a test sample. FIG. 1 depicts a molecular POCT diagnostic device 100 in accordance with an exemplary embodiment of the present invention. The molecular POCT diagnostic device 100 as depicted in FIG. 1 is in a form that different components of the devices are assembled together to form an integrated device suitable for use by a user in assaying the test sample. Before the device 100 is used, the components are usually separately stored and the device 100 is provided in a form of a test kit.

In FIG. 1, a reference vertical direction 103 is defined. Herein in the specification and appended claims, positional and directional words such as "above," "below," "higher," "upper," "lower," "top," "bottom" and "horizontal" are interpreted with reference to the reference vertical direction 103.

The device 100 comprises a sample tube 10 and a microfluidic-based reaction tube 30. The sample tube 10 is used for receiving the test sample. Generally, the test sample is carried in a nasal swab after being used by a user. The sample tube 10 includes a sample buffer for mixing with the test sample. The reaction tube 30 is insertable into the sample tube 10 for receiving the sample buffer that is mixed with the test sample. The reaction tube 30 includes one or more reaction chambers. An individual reaction chamber (e.g., the reaction chamber 34) is arranged to receive a portion of the received sample buffer. The individual reaction chamber includes an amplification reagent for amplifying a test-sample content in the received portion of the received sample buffer to yield an amplified result used for assaying the test sample. The reaction tube 30 is configured to lock and seal the reaction tube 30 and the sample tube 10 together to create a closed enclosure when the reaction tube 30 is inserted into the sample tube 10. Advantageously, the closed enclosure confines the sample buffer for avoiding contamination of the sample buffer from outside the sample tube 10 and the reaction tube 30 during generation of the amplified result.

In one practical implementation of the device 100, four reaction chambers are housed in the reaction tube 30.

The device 100 works by using isothermal-based nucleic acid amplification to amplify nucleic acids of a specific pathogen in the test sample. Heating is applied to the reaction tube 30 for triggering and sustaining the amplification reaction.

Preferably, the amplification reagent in the individual reaction chamber is a dried amplification reagent.

For practical advantages, it is preferable that the device 100 further comprises an inner tube 20 configured to filter the sample buffer before the sample buffer reaches the reaction tube 30. The inner tube 20 is connectable to the reaction tube 30 such that the reaction tube 30 receives the sample buffer from the sample tube 10 via the inner tube 20. The inner tube 20 is housed inside the sample tube 10 when the reaction tube 30 connected with the inner tube 20 is inserted into the sample tube 10. The inner tube 20 comprises an inner-tube opening 21 and a filer 22. The inner-tube opening 21 is located at one end of the inner tube 20, and is used for receiving the sample buffer from the sample tube 10. The filer 22 is proximal to the inner-tube opening 21, and is used for filtering the sample buffer before the sample buffer reaches the reaction tube 30 to thereby prevent possible cell debris from entering into the reaction tube 30.

In the reaction tube 30, typically the one or more reaction chambers are located at a bottom part 131 (which is herein also referred to as a first end portion 131) of the reaction tube 30. Usually, the individual reaction chamber has a shape of a well. Similarly, a top part 132 (which is herein also referred to as a second end portion 132) of the reaction tube 30 is an end portion of the reaction tube 30 opposite to the bottom part 131.

Preferably, the reaction tube 30 further comprises one or more channels (e.g., channel 31) connecting the top and bottom parts 131, 132 of the reaction tube 30. The individual reaction chamber is further installed with one of said one or more channels connecting the individual reaction chamber to the top part 132 of the reaction tube 30. Without loss of generality, hereinafter the individual reaction chamber is described with reference to the reaction chamber 34, which is used as a representative reaction chamber for illustration. The reaction chamber 34 as shown in FIG. 1 is installed with the channel 31 used for drawing the sample buffer from the top part 132 of the reaction tube 30 to the reaction chamber 34. The reaction chamber 34, which also stores the amplification reagent, is connected to the channel 31 by a seal 36.

On the lateral side of reaction tube 30, it is preferable that O-rings 35*a*, 35*b*, and 35*c* are placed to lock and seal the reaction tube 30 with other parts of the device 100. For convenience, the three O-rings 35*a-c* are referred to as a top O-ring 35*a*, a middle O-ring 35*b* and a bottom O-ring 35*c*, respectively. Also for convenience, herein in the specification and appended claims, the top O-ring 35*a*, the middle O-ring 35*b* and the bottom O-ring 35*c* are also referred to as a second O-ring 35*a*, a first O-ring 35*b* and a third O-ring 35*c*, respectively. Upon merging the sample tube 10, the inner tube 20 and the reaction tube 30, the first O-ring 35*b* locks and seals the reaction tube 30 and the sample tube 10, and the second O-ring 35*a* locks and seals the reaction tube 30 and the inner tube 20. Note that as the first O-ring 35*b* locks and seals the reaction tube 30 and the sample tube 10 when the reaction tube 30 is inserted into the sample tube 10, the closed enclosure is created.

Alternatively, the top and middle O-rings 35*a*, 35*b* in the reaction tube 30 may be replaceable with an in-built snap lock system to lock the inner tube 20 and the sample tube 10 in place. The snap lock forms a closed tube, preventing opening by the user after the sample tube 10 is locked into position. The snap lock for the inner tube 20 locks the inner tube 20 into the top part 132 of reaction tube 30.

The sample tube 10, inner tube 20 and reaction tube 30 collectively constitute a sample processing unit 110, which is one part of the device 100 for processing the test sample to form the amplified result. A reading cassette 900, which forms another part of the device 100, is used for assaying the amplified result. The reading cassette 900 will be described later.

Figure 2:
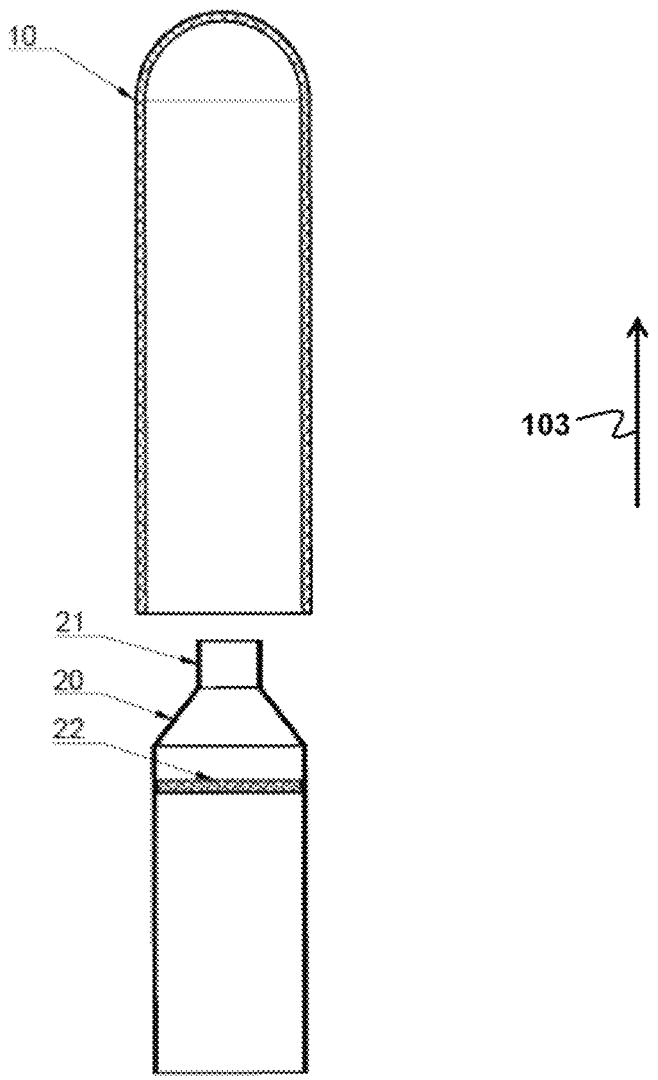
FIG. 2 depicts, in accordance with certain embodiments of the present invention, a sectional view of the sample tube and the inner tube.

FIG. 2 depicts a sectional view of the sample tube 10 and the inner tube 20. The sample tube 10 is a hollow tube used for an initial entry of the test sample in form of nasal swab. The sample buffer in the sample tube 10 is controlled to fill the inner tube 20 after heating, through the inner-tube opening 21. The filter 22 is placed near the inner-tube opening 21 in order to prevent the cell debris from entering into the reaction tube 30. The inner tube 20 and sample tube 10 may be made of plastic materials, for example, transparent, molecular biology-grade plastic or lab-grade plastic such as polypropylene.

In one embodiment, the sample tube 10 is substantially-cylindrically shaped, and the inner-tube opening 21 is a small anterior opening 21 that widen up to the filter 22 and the rest of the inner tube 20.

In one embodiment, the inner tube 20 has a substantially-tubular shape, and is made of transparent molecular-grade plastic. The filter 22 is essentially made of glass fiber or silica gel.

It is preferable that the inner tube 20 further comprises a plastic ring located proximal to the filter 22 for putting the filter 22 in place during use.

It is also preferable that an additional dried reagent for the sample buffer is stored in the filter 22 inside the inner tube 20. The additional dried reagent dissolves upon mixing with the sample buffer.

Preferably, a heat sensing mechanism is installed in the inner-tube opening 21. The heat sensing mechanism locks the inner-tube opening 21 and prevents the sample buffer to flow inside the inner tube 20 under room temperature, but the heat sensing mechanism opens the inner-tube opening 21 when the temperature of the sample buffer reaches or exceeds a certain predetermined temperature above the room temperature (e.g., reaching or exceeding 60° C.).

Figure 3:
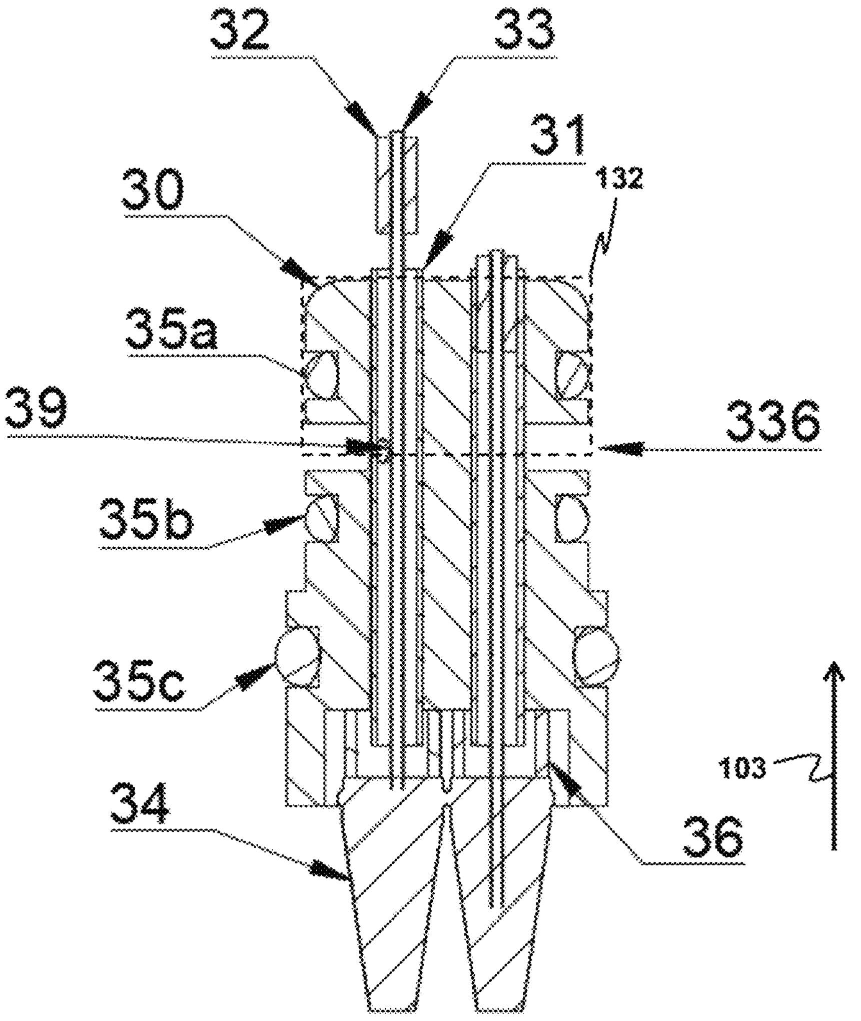
FIG. 3 depicts a sectional view of the microfluidic-based reaction tube in accordance with certain embodiments of the present invention.
Figure 4:
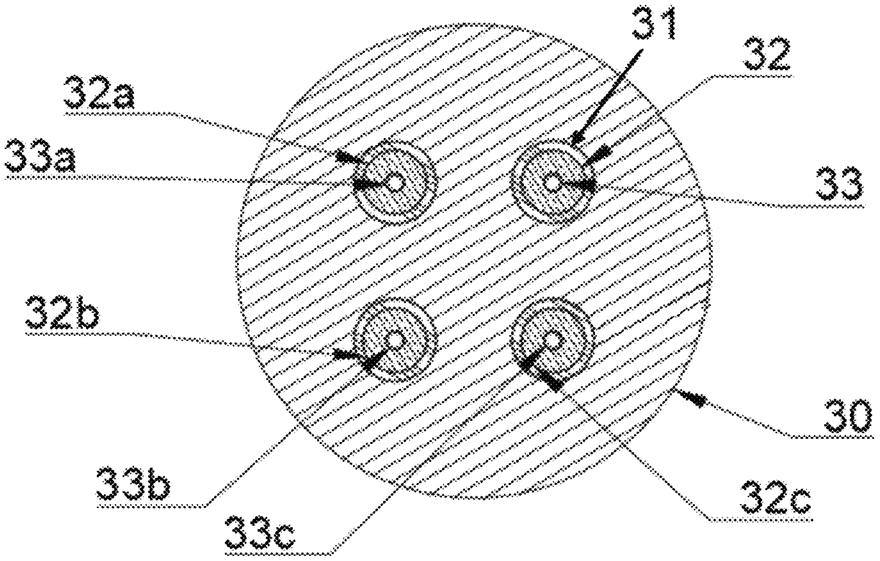
FIG. 4 depicts a top perspective view of the microfluidic-based reaction tube.
Figure 5:
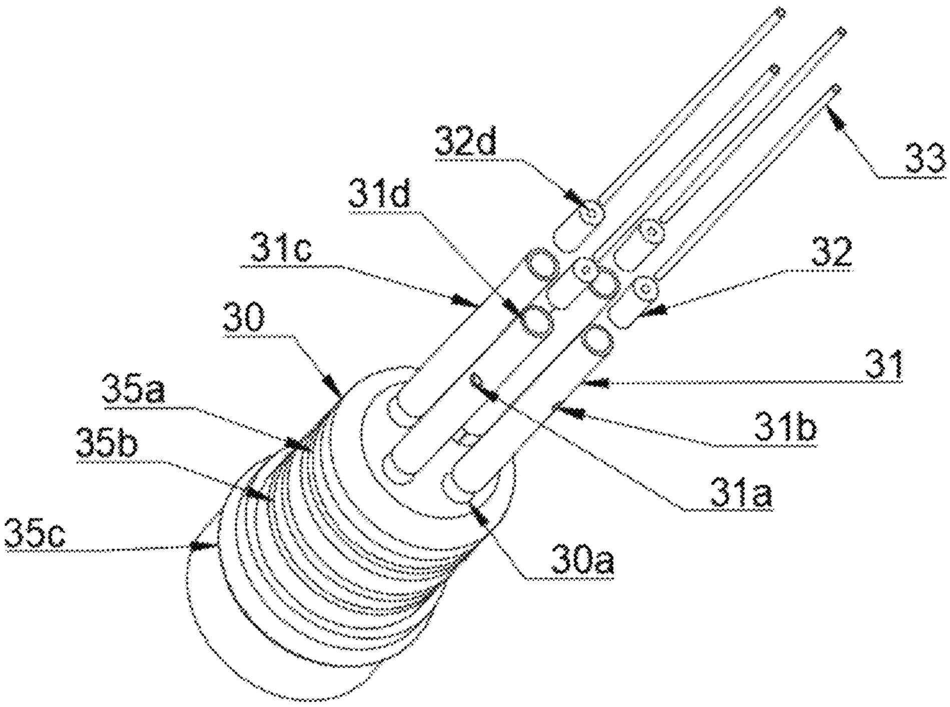
FIG. 5 depicts an exploded view of the microfluidic-based reaction tube.
Figure 6:
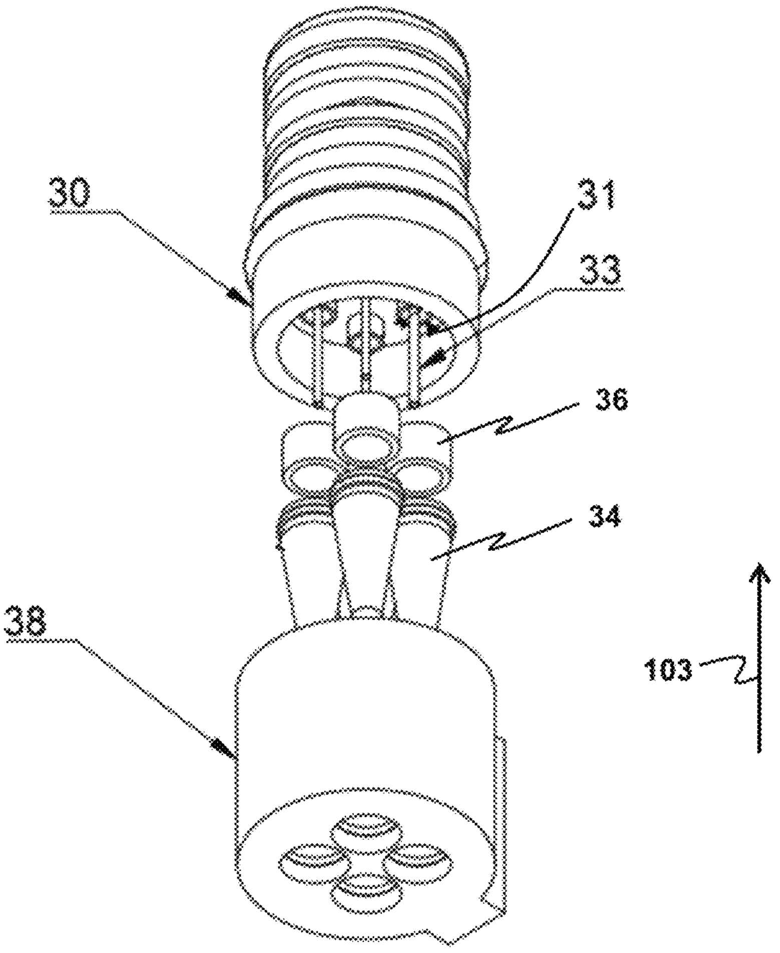
FIG. 6 depicts an exploded view of the bottom part of the microfluidic-based reaction tube.
Figure 7:
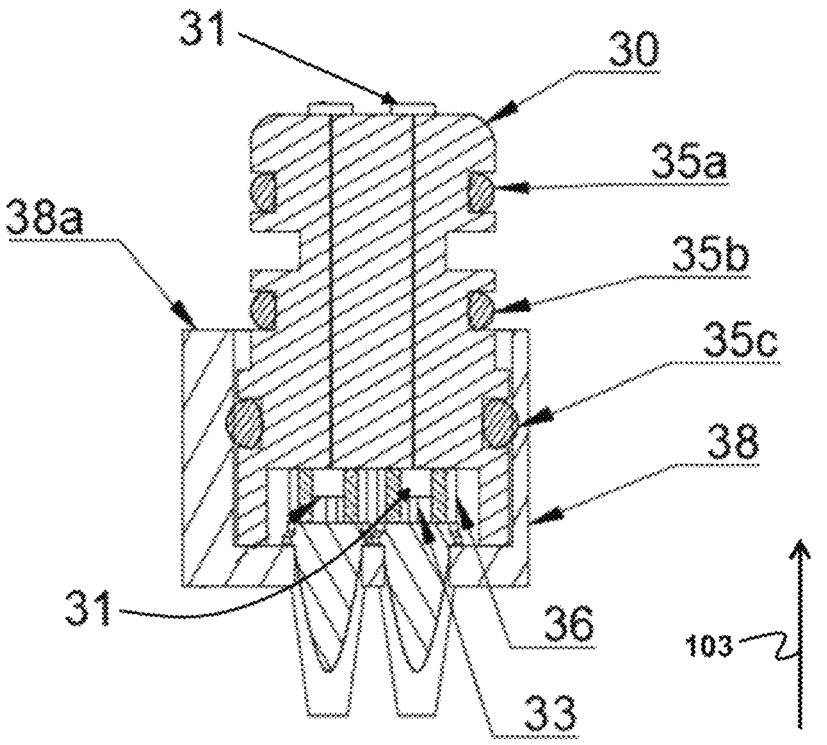
FIG. 7 depicts a sectional view perspective of the bottom part of the microfluidic-based reaction tube, cut from the middle part.
Figure 8:
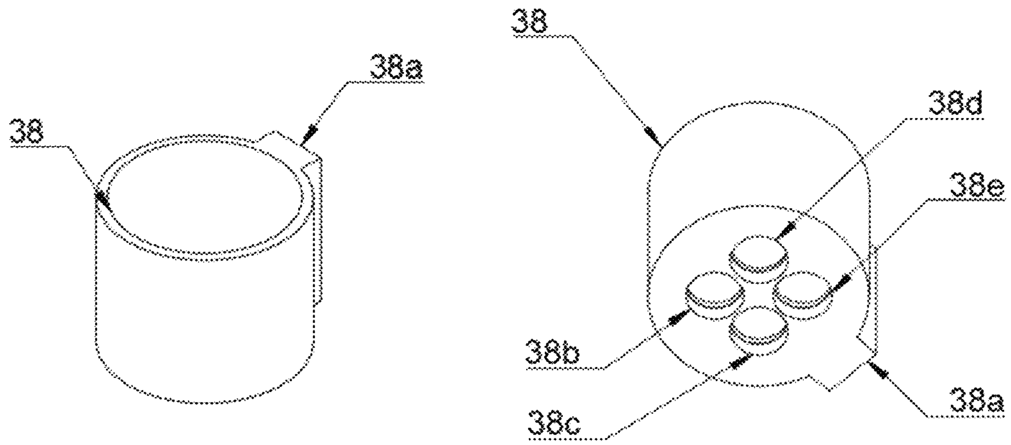
FIG. 8 depicts a side perspective view of the cover of the microfluidic-based reaction tube.

FIGS. 3-8 illustrate the reaction tube 30 viewed from various perspectives. FIG. 3 depicts a sectional view of a part of the reaction tube 30 distal from the one or more reaction chambers, i.e. around the top part 132 of the reaction tube 30. FIG. 4 is a top view of the reaction tube 30 and FIG. 5 is an exploded view of the same portion of the reaction tube 30. FIGS. 6 and 7 depict exploded and sectional views of the bottom part 131 of the reaction tube 30, respectively. FIG. 8 depicts a bottom cover 38 of the reaction tube 30.

Refer to FIGS. 3 and 4, which depict the sectional and exploded views of the top part 132 of the reaction tube 30, respectively. During use of the device 100 for testing the test sample, the reaction chamber 34 receives a portion of the sample buffer obtained by the reaction tube 30. The reaction chamber 34 is installed with a capillary tube 33 used for transporting the portion of the received sample buffer from the top part 132 of the reaction tube 30 to the reaction chamber 34. Particularly, the capillary tube 33 is positioned inside the channel 31. A centrally-open plug 32 is embedded into the channel 31, for example, by fastening to or in-built molding with the channel 31. The centrally-open plug 32 covers the channel 31 and allows the capillary tube 33 to go through the channel 31 so as to advantageously prevent uncontrolled spill of the sample buffer into the reaction chamber 34 while allowing the portion of the received sample buffer to enter into the reaction chamber 34.

Preferably, the capillary tube 33 is designed to limit an amount of sample buffer flowable into the reaction chamber 34 in order to properly control the amplification process taken place in the reaction chamber 34, e.g., to avoid generation of an excessive amount of amplified result that might cause inaccuracy in subsequent LFA analysis.

In one embodiment, the capillary tube 33 is sealed with a heat-sensitive valve, where the heat-sensitive valve is openable when exposed to heat. As mentioned above, the sample buffer in the sample tube 10 is controlled to fill the inner tube 20 after heating. The installation of the heat-sensitive value on the capillary tube 33 reduces a chance of accidentally contaminating the reaction chamber 34 before the reaction tube 30 is deployed.

In one embodiment, there are four respective reaction chambers in total in the reaction tube 30. As shown in FIGS. 4 and 5, the reaction tube 30 has four different channels 31,

31*a*, 31*b*, 31*c* collectively arranged in an "X" shape. Preferably, the X shape is a square, so that the four channels 31, 31*a*, 31*b*, 31*c* are arranged in a square configuration. The four channels 31, 31*a*, 31*b*, 31*c* are plugged with four centrally-open plugs 32, 32*a*, 32*b*, 32*c* through which four capillary tubes 33, 33*a*, 33*b*, 33*c* pass through, respectively.

The reaction tube 30 and the channel 31 (or each of the channels 31, 31*a*, 31*b*, 31*c*) may be made of a thermostable plastic, for example polypropylene. The centrally-open plug 32 may be made of thermostable silicone or rubber. The capillary tube 33 may be made of a hydrophobic material, for example hydrophobic PTFE tubes.

In one embodiment, the reaction tube 30 further comprises a crevice gap 336 located between the top O-ring 35*a* and the middle O-ring 35*b*. The crevice gap 336, which is a depression on the reaction tube 30, exposes lateral sides of respective channels installed for the one or more reaction chambers (e.g., the channel 31 installed for the reaction chamber 34). Thus, the crevice gap 336 is used for exposing the respective channels to outside the reaction tube 30. Additionally, one or more holes are formed on each of the respective channels at the crevice gap 336 for displacing air in the one or more reaction chambers during transfer of the sample buffer. For instance, a hole 39, which is formed on the channel 31, penetrates the lateral side of the channel 31 and exposes the inner part of the channel 31. The hole 39 may have a diameter around 1 mm. In one embodiment, the gap 336 has an adjustable width. The width of the gap 336 may be adjusted depending on the volume of liquid that needs to be transferred into the reaction chamber 34.

Refer to FIG. 6. In one embodiment, the individual reaction chamber further comprises a seal enclosing a junction between the individual reaction chamber and its corresponding channel for sealing the function. Consider the reaction chamber 34. The capillary tube 33 spans through the top part 132 of the reaction tube 30 to the bottom part 131 reaching the reaction chamber 34, which is conjoined to the reaction chamber 34 by the seal 36. The seal 36 is positioned on the reaction chamber 34 on one end and the channel 31 on the other end, forming a tight, leak-proof junction to transfer liquid from the top part 132 to the bottom part 131, where the reaction chamber 34 is located. The seal 36 is used to provide an air-tight junction, assisting the liquid transfer from the channel 31 to the reaction chamber 34, and ensuring that the liquid is transported into the reaction chamber 34 properly. The seal 36 may be made of silicone.

The reaction chamber 34 may be made of plastic, with a thin wall to facilitate breaking of the wall and transfer of the amplified result.

Although four reaction chambers are often used as an example configuration for illustrating the device 100 and for representing the one or more reaction chambers, the present invention is not limited to this number of reaction chambers. Those skilled in the art will appreciate that the total number of reaction chambers in the device 100 may be adjusted to have less or more reaction chambers depending on, for instance, the number of molecular targets desired to be assayed. Those skilled in the art will also appreciate that the reaction chamber 34 may have a shape different from a well, and may be designed with an appropriate shape for facilitating easy breaking of the reaction chamber to allow amplicon flow.

Refer to FIGS. 6-8. Preferably, the device 100 further comprises a cover 38 for providing convenience to a user in handling the device 100. Preferably, the cover 38 is fastened to the reaction tube 30 through the bottom O-ring 35*c*, and the reaction chamber 34 goes through the bottom cover 38, securing the reaction chamber 34 connection to the channel 31 via the seal 36 in place. In one embodiment, the cover 38 contains four holes (38*b*, 38*c*, 38*d*, 38*e*) for the four respective reaction chambers housed in the reaction tube 30. In one embodiment, a protrusion 38*a*, preferably semi-rectangular in shape, is placed on the lateral side of the cover 38, where the protrusion 38*a* acts as a guide for tube insertion in the reading cassette 900 to be described later.

In one embodiment, as illustrated in FIG. 7, the cover 38 supports the placement of reaction chamber 34 (and all other reaction chambers in the reaction tube 30) and secures the connection between the channel 31 with the assistance of the seal 36 for providing an air-tight and leak-proof junction. The bottom O-ring 35*c* provides anchorage for the cover 38 to stick into the reaction tube 30.

As mentioned above, the top and middle O-rings 35*a*, 35*b* in the reaction tube 30 may be replaced with the in-built snap lock system to lock the inner tube 20 and the sample tube 10 in place. Preferably, the one or more reaction chambers in the reaction tube 30 and the cover 38 are integrated into one structure, combined with the in-built snap lock located on the outer layer of the reaction tube 30 and the inner layer of the cover 38. Additionally, a continuous tube extending from the top part 132 of the reaction tube 30 at a posterior opening thereof, in which the posterior openings of the channel 31 and of the capillary tube 33 are enveloped within, directly connect to the reaction chamber 34 to thereby replace the seal 36 with air-tight tube. This arrangement is also applicable to other reaction chambers in the reaction tube 30.

Figure 15:
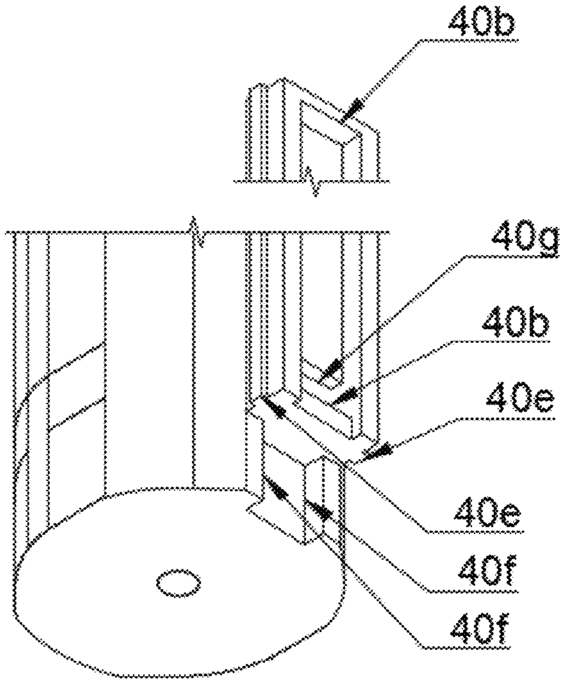
FIG. 15 depicts a side perspective view of the bottom part of the reading cassette of FIG. 9 without the cover.
Figure 16:
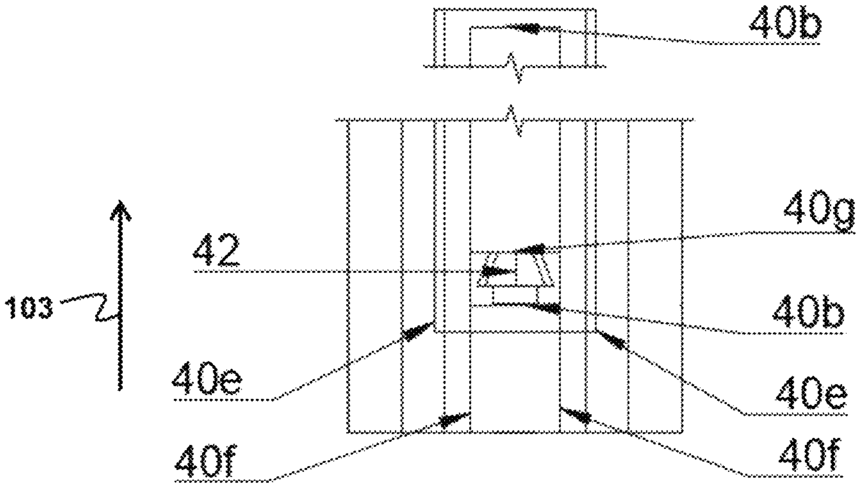
FIG. 16 depicts a front perspective view of the bottom part of the reading cassette of FIG. 9 without the cover.
Figure 17:
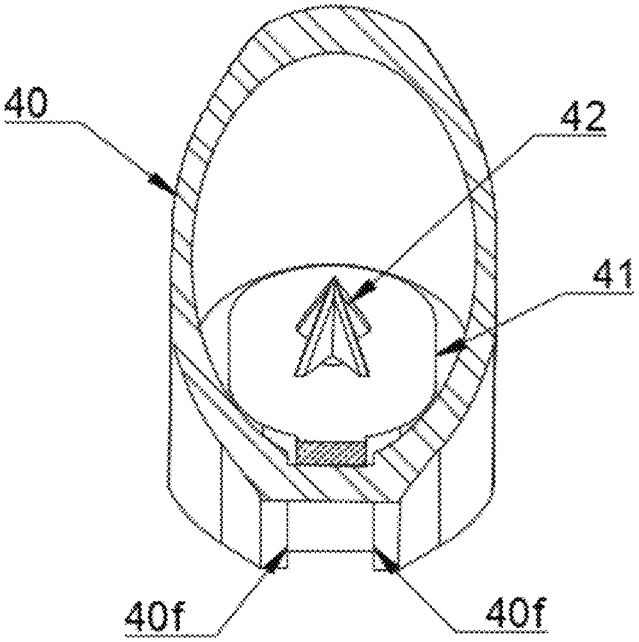
FIG. 17 depicts a diagonal sectional view of the bottom part of the reading cassette of FIG. 9.

FIGS. 9-17 display different parts of the reading cassette 900, where a LFA strip is stored and kept locked in a housing covered with a transparent slider and a tube opening used for inserting the reaction tube 30 after the reaction is completed. FIGS. 10-13 illustrate the top view, side views and bottom view of the reading cassette 900 with the transparent slider 43. FIGS. 15-16 show the bottom part of the reading cassette 900 with the LFA housing part cut out to simplify illustration. FIG. 17 shows the sideway section showing the inside of the hollow tube.

Figure 9:
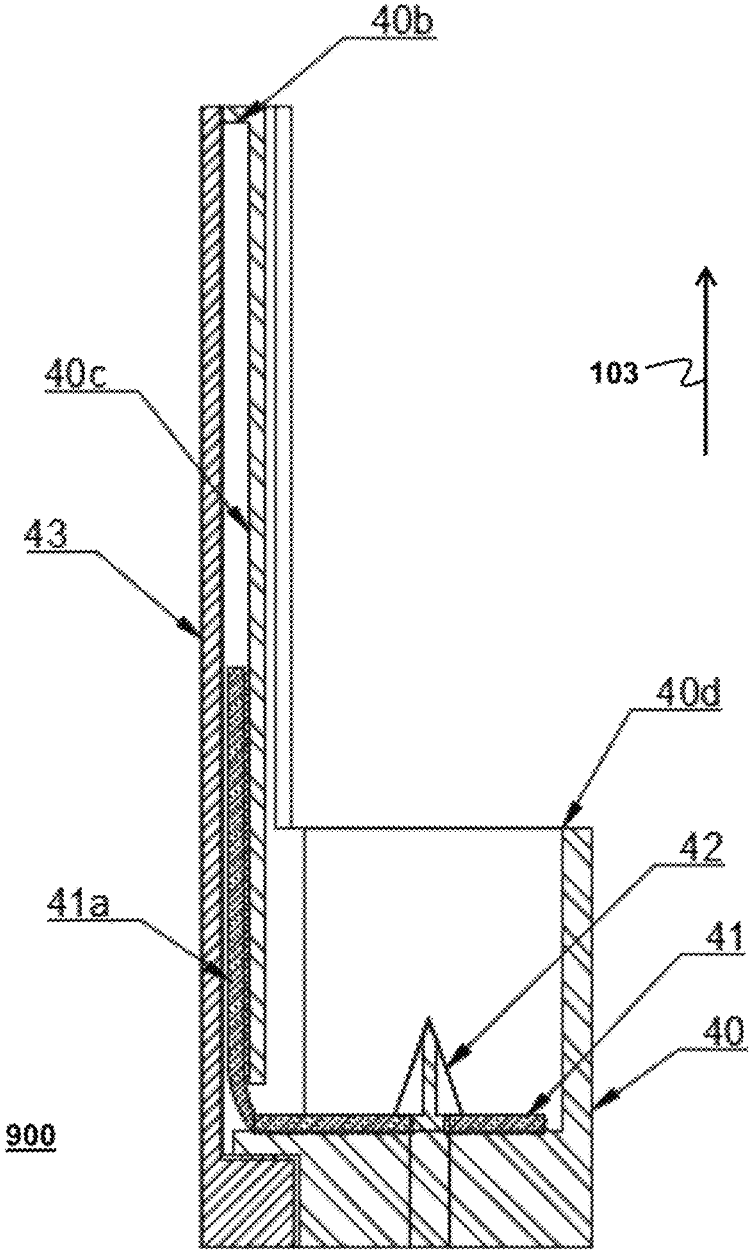
FIG. 9 depicts a sectional view of side perspective of the reading cassette.

FIG. 9 depicts an exemplary structure of the reading cassette 900 of the device 100. The reading cassette 900 is used for assaying the amplified result. Exemplarily, the reading cassette 900 comprises a main body 40, a LFA strip housing 40*c*, a puncturing blade 42, a glass filter 41, and preferably a transparent slider 43. The main body 40 is formed with a hollow tube 40*d* used for receiving the reaction tube 30. The LPA strip housing 40*c* is used for housing a LFA strip used for performing LFA. The puncturing blade 42 is located at the hollow tube 40*d* for rupturing the one or more reaction chambers in the reaction tube 30 when the reaction tube 30 is inserted into the hollow tube 40*d*, thereby releasing the amplified result from the one or more reaction chambers. The glass fiber 41 connecting the puncturing blade 42 and the LFA strip housing 40*c* for transporting the released amplified result to the LFA strip such that the test sample is assayed. The operation principle of the reading cassette 900 is elaborated as follows. The reaction tube 30, which is already merged with the sample tube 10, is placed inside the main body 40 into the hollow tube 40*d*. The user pushes the reaction tube 30 downward to break the one or more reaction chambers containing the amplified result upon the one or more chambers contacting with the puncturing blade 42. Through capillary force, the amplified result released from the broken one or more reaction chambers move through over the glass fiber 41, originating from below the puncturing blade 42 to the other end of the glass fiber 41*a*, which is located on the vertical LFA strip housing 40*c*. On the opposite end of glass fiber 41*a* in the strip housing the protruding end 40*b* covers both the top and bottom edge and provides a closed environment once the transparent slider 43 is put in place.

Typically, the sample buffer liquid, sucked by the capillary force in the glass fiber 41, flows from the inner tube 20 through the capillary tube 33 into the ruptured reaction chamber 34 and eventually into the glass fiber 41. Consequently, this liquid flow concurrently pushes the amplified result from the reaction chamber 34 along to the vertical end (41*c*) of the glass fiber 41.

In one embodiment, a locking mechanism is installed in the medial part of the hollow tube 40*d* wall and on the lateral part of the cover 38. The locking mechanism fully embraces the reaction tube 30 and is unopenable by the user once it is locked in place, resulting in a permanent lock upon insertion of the reaction tube 30 into the tube 40*d*. As a result, it prevents contamination of the amplified result into the environment and leaking of sample buffer during operation. The whole reaction tube 30 acts as a seal to prevent any spreading of the amplified results, thus minimizing contamination for successive use. The other orifices are sealed by the transparent slider 43, allowing a clear view of the LFA strip that displays the LFA result in a sealed strip housing 40*c*.

Figure 10:
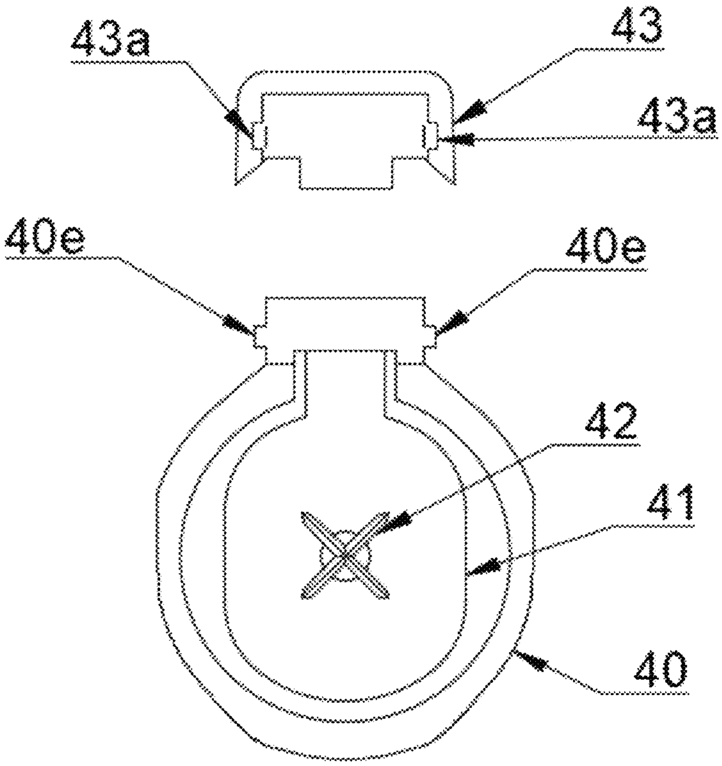
FIG. 10 depicts a top perspective view of the reading cassette and a cover shown in FIG. 9.
Figure 11:
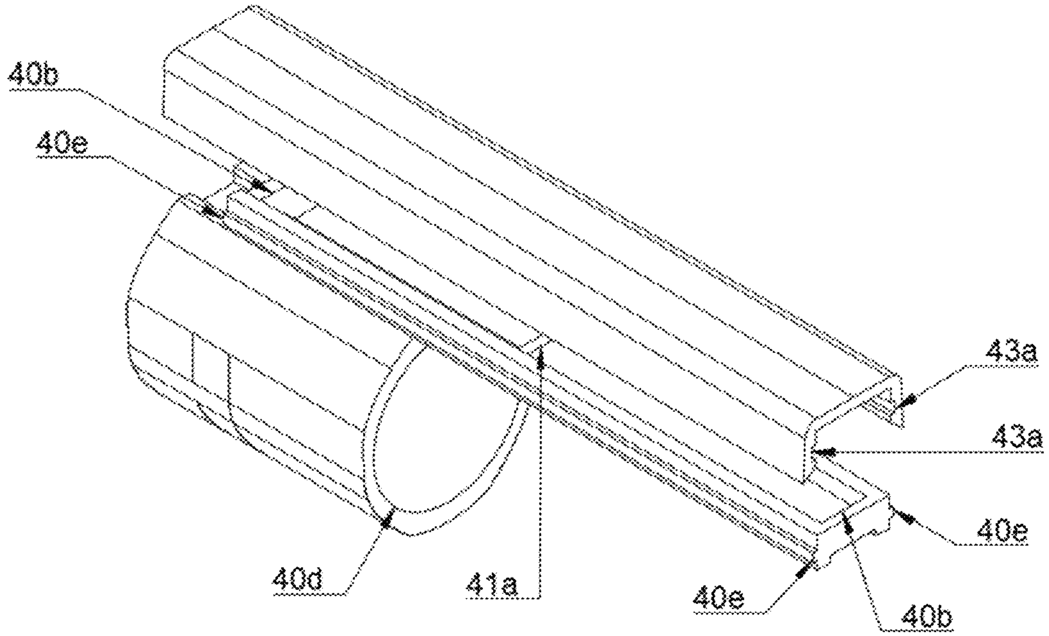
FIG. 11 depicts a side perspective view of the top part of the reading cassette and the cover of FIG. 9.
Figure 12:
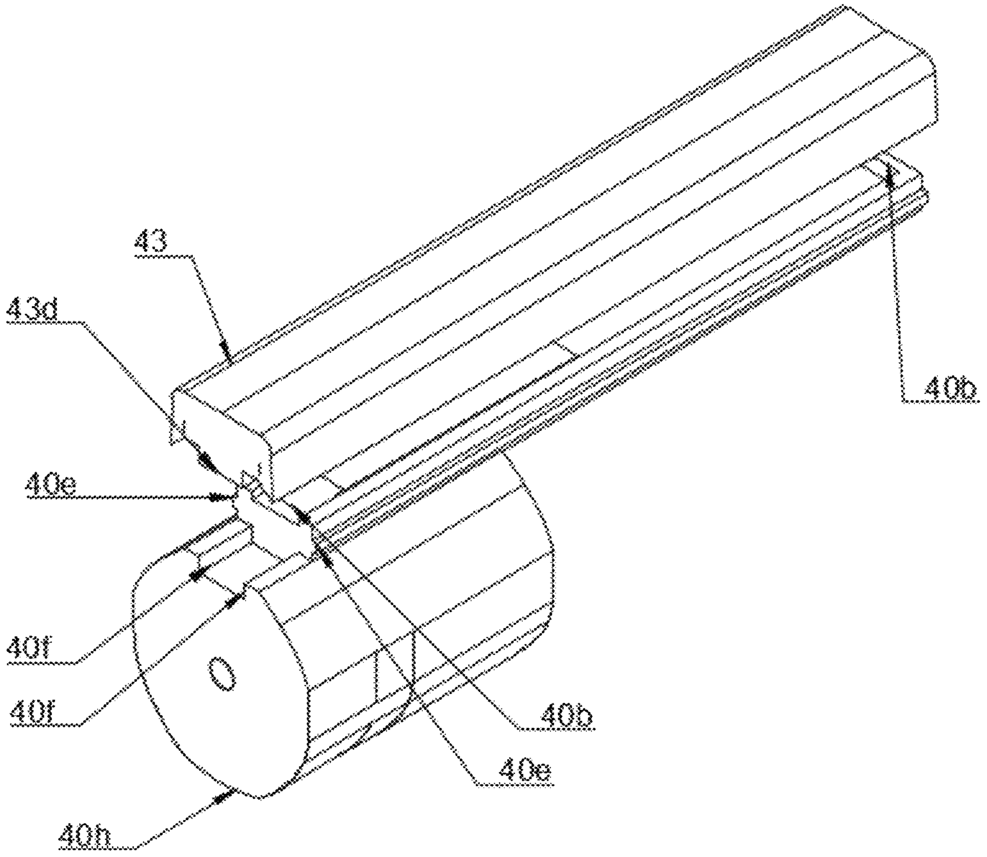
FIG. 12 depicts a side perspective view of the bottom part of reading cassette and the cover of FIG. 9.
Figure 13:
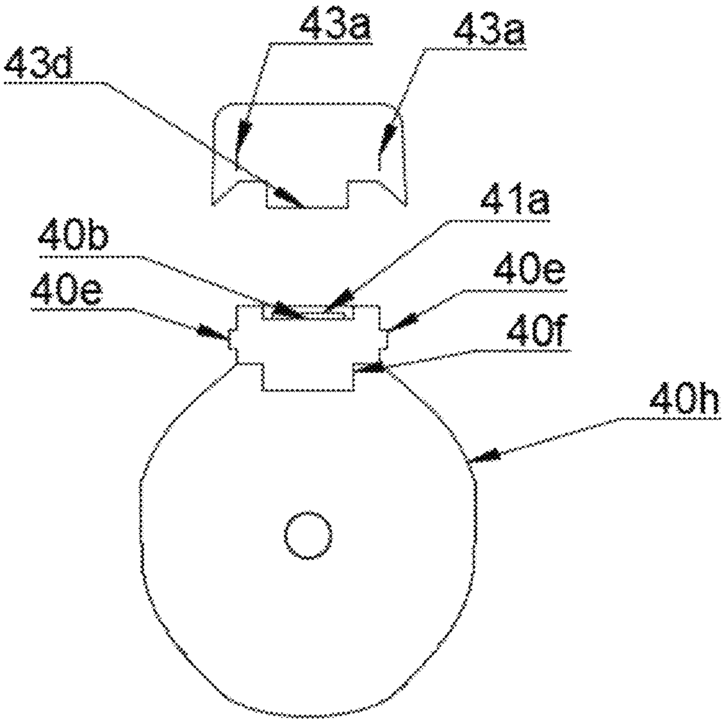
FIG. 13 depicts a bottom perspective view of the reading cassette and the cover of FIG. 9.
Figure 14:
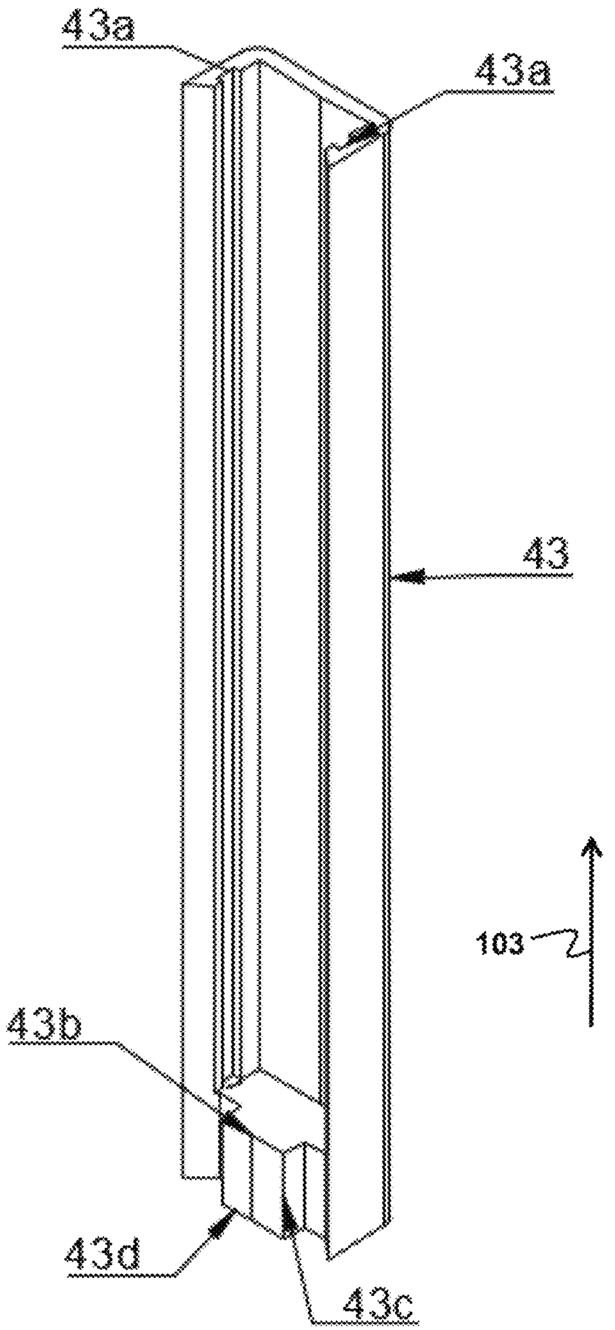
FIG. 14 depicts the cover of the reading cassette of FIG. 9.

FIGS. 10-12 illustrate the top and side views of the reading cassette 900 with the slider 43. Preferably, the strip housing 40*c* comprises protruding edges (40*e*) on both of the lateral sides, which act as guide and locking mechanism for the slider 43. Consequently, a pair of depression (43*a*) in the slider 43 acts as the negative shape for the protruding edges 40*e*. These pairs allow the closing of strip housing compartment 40*c* using the slider 43 to create a waterproof and air-tight barrier, which helps protect the LFA strip from damage and limit possible contamination after use. The edges 40*e* span from the top to the bottom of the strip housing 40*c*.

Refer to FIGS. 10 and 17. Consider the case that the reaction tube 30 has four reaction chambers. Preferably, the blade 42 is shaped as 2 crossing blades, shaped like an arrowhead with a X arrangement to properly puncture all the four reaction chambers. As a result, the puncturing blade 42 is shaped as a 4-point wide barbed arrowhead such that all the four reaction chambers are ruptured when the reaction tube 30 is inserted into the hollow tube 40*d*. The blade 42 may be made of steel, a metal, or a hard plastic material. The glass fiber 41 is placed below the blade 42 to soak the amplified result and successively, the sample buffer liquid.

Note that the blade shape and placement are not limited to what are described above. The blade shape and placement may be adjusted to fit the shape of the one or more reaction chambers in the most efficient way to break the reaction chambers with least force and a minimal chance of error.

Refer to FIGS. 11-14. Preferably, a crevasse 40*f* is placed on the ventral end of the strip housing 40*c* as a locking mechanism for the slider 43. The slider 43 is sliding upwards from 40*f* location, until the 43*c* part locks with 40*f* and the 43*d* bottom is level with the bottom surface 40*h* and surface 43*b* touch the ventral side of the strip housing 40*c*, creating a lock to keep the slider 43 in place and preventing any possible leak from the strip housing 40*c*.

Refer to FIGS. 15 and 16. Preferably, a small opening 40*g* at the bottom of the strip housing 40*c* connects the bottom of the tube, where the glass fiber 41 spans through. The opening 40*g* is at least 3 mm×5 mm, allowing transfer of amplified result through the glass fiber 41 to the LFA strip located in the housing 40*c*.

Figure 18:
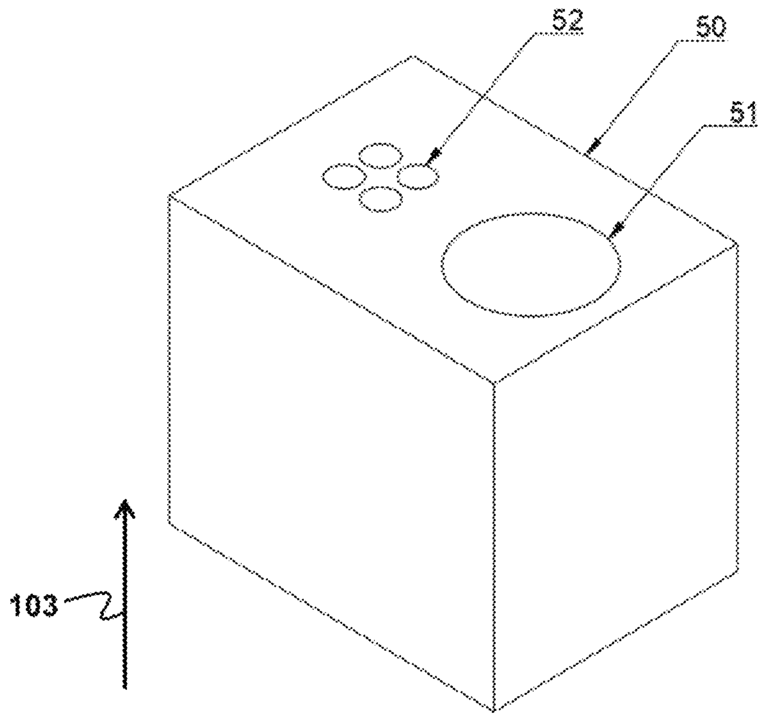
FIG. 18 depicts a heating block for the reaction in accordance with certain embodiments of the present invention.
Figure 19:
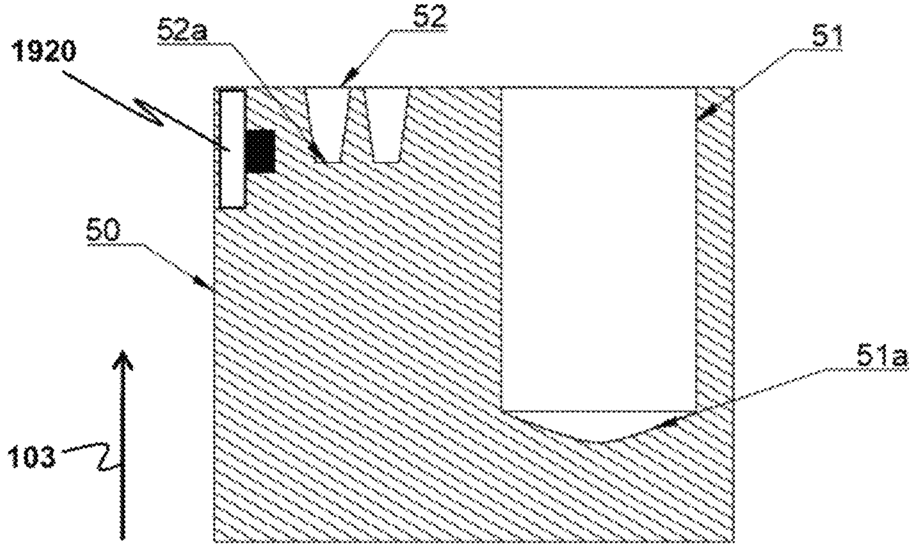
FIG. 19 depicts a sectional view of the heating block of FIG. 18.

As mentioned above, heating the reaction tube 30 is required for initiating and sustaining the amplification reaction. The whole device 100 works with a heating block 50, as illustrated in FIGS. 18 and 19, for heating the reaction tube 30. The heating block 50 is preferred to be realized as a handheld heater. Preferably, the heating block 50 possesses cavities to contain the sample tube 10 and the one or more reaction chambers. A first cavity 51 in the heating block 50 is designed to fit the sample tube 10, with a curved bottom 51*a* to facilitate the curved structure of the sample tube 10, ensuring that heat exposure is even throughout the sample tube 10. Similarly, second cavities 52 are designed to fit the one or more reaction chambers. The heating block 50 can be made of aluminum or other lightweight metals with good thermal conductivity, with a dimension of at least 25 mm×20 mm and height of at least 30 mm. The first cavity 51 is drilled with a depth of at least 27 mm from the center depth of bottom 51*a* to the surface, and each second cavity 52 is conical-shaped to follow the shape of the one or more reaction chambers (such as the reaction chamber 34), with 5 mm to 5.5 mm in depth and a diameter of 3.5 mm.

Preferably, the heating block 50 contains a group of first cavity 51 and second cavity 52, which are required for device operation. In one embodiment, to support multiple samples processing, heating blocks may be produced to have more than one group of cavities 51 and 52. In yet another embodiment, the shapes and dimensions of the cavities 51, 52 may be altered to fit the shapes and dimensions of the sample tube 10 and the one or more reaction chambers, and the arrangement of cavities 51 and 52 may also be combined into one cavity.

In the heating block 50, the bottom part 52*a* of the second cavities 52 for the reaction tube 30 may be hollow and a camera 1920 may be installed nearby said bottom part 52*a*, in case that colorimetric-based result reading is used. The camera 1920 is used for recording a color change of the reaction mixture received in the one or more reaction chambers consistently since the reaction starts as a result of heating the reaction tube 30, allowing real-time colorimetric-based measurement to be carried out.

Figure 20:
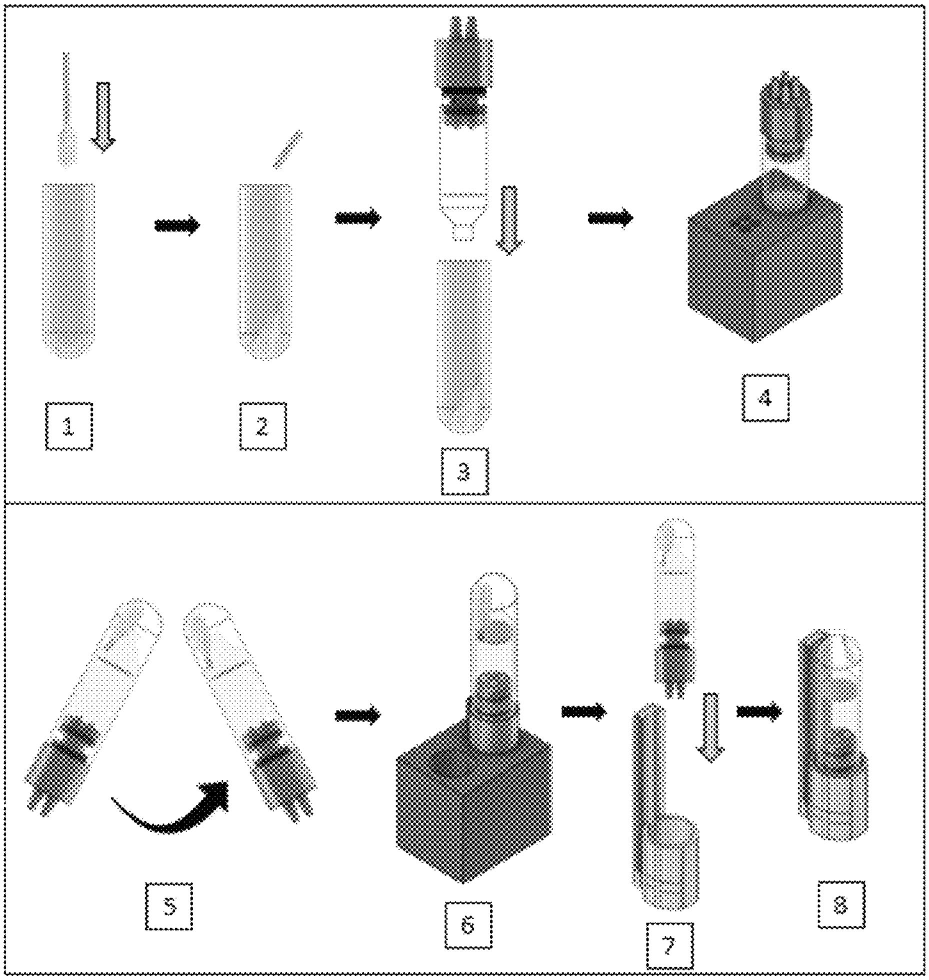
FIG. 20 shows a visualized, step-by-step user protocol for a device use.

FIG. 20 illustrates preferred operational steps of the disclosed POCT device 100. Following the sequences, a nasal swab after taking a nasal sample is placed into the sample tube 10 (step 1), then snaps the nasal swab, leaving the top part with the sample inside the sample tube 10 (step 2). The reaction tube 30 attached to the inner tube 20 is connected to the sample tube 10 to form a combined tube (step 3), then put in hole 51 in the heating block 50 (step 4). The sample buffer is transferred to the one or more reaction chambers by inverting the combined tube, then swinging it for a short time and checking visually if the liquid has entered into the one or more reaction chambers (step 5), then insert the one or more reaction chambers into the hole 52 in the heating block 50 (step 6). After the reaction time is completed, the combined tube is placed in reading cassette 900 through the hollow tube 40*d* (step 7), then press down until the combined tube is locked in place, and the result will be displayed on the LFA strip after several minutes (step 8).

The detailed protocol mentioned above is only one of the possible embodiments of the invention. In other embodiments, samples can be in form of, but not limited to, buccal swab, nasopharyngeal or oropharyngeal swabs, anal swab, skin swab or vaginal swab depending on the pathogens.

In other embodiments, the resulting amplicons may be transferred through microfluidic channels or through capillary force instead of using glass fiber. In yet another embodiment, other methods of result interpretation, including but not limited to, colorimetric and fluorometric change, could be integrated with the invention to provide alternatives to LFA-based reading and more versatile system in detecting multiple targets. In another embodiment, more user-friendly features, such as but not limited to, remote/mobile operation, single button activation, and automated result reading are potential implementation for the device system.

Figure 21:
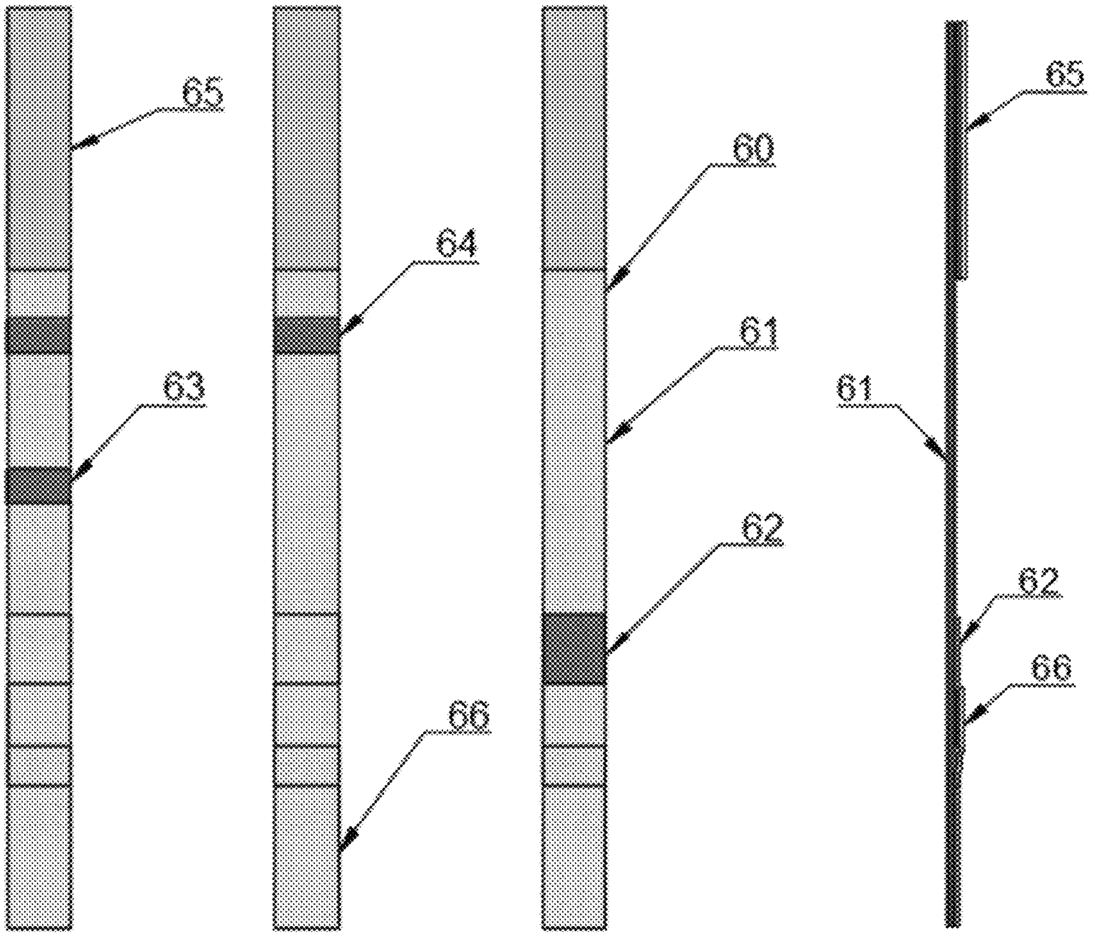
FIG. 21 shows, as an example for illustration, a LFA strip for visual detection with positive and negative results interpretations.

FIG. 21 illustrates the LFA strips for result interpretation. In one embodiment, a LFA strip 60 consists of nitrocellulose body 61 as the backbone of the strip, conjugate pad 62 to store the sensors that will carry the amplified results to the antibody-coated regions 63 and 64. An absorbent pad 65 is placed on the posterior end of the strip to hold excess liquid after strip activation, and a sample pad 66 is placed on the anterior end to receive amplified products.

In another embodiment, the LFA strip contains more than two antibody regions, allowing detection of two or more targets in one reaction. The incorporation of additional antigens in the amplification reaction results in tagged amplicons that can be distinguished by these different antibodies, resulting in simultaneous detection of targets appearing as bands in the LFA strips. In yet another embodiment, multiple LFA strips can be installed in the reading cassette 900 to detect various targets concurrently, further multiplying the possible number of targets that can be detected with the system.

In another embodiment, the sample swab can be obtained from another source aside from nasal, which is alterable according to the intended pathogen detection. In yet another embodiment, the duration of sample processing and reaction are modifiable depending on the sample and pathogen types. In yet another embodiment, the device 100 can be used to detect specific mutations in the cancer cells that are caused by chromosomal rearrangements, deletions or insertions in the chromosomes.

The present invention provides a rapid, easy-to-use, versatile multiple pathogen detection platform for non-laboratory or non-trained personnel use. Due to its small footprint and disposability, the device 100 is usable in field deployment or wide-scale testing conditions, which need only 40-45 minutes from the sample introduction and operable by people with minimal or no prior laboratory training.

The device 100 may be used for rapid test in locations where quick screening of specific disease is needed, such as in the case of COVID-19 pandemic, in cross-border transportation hubs and in hospitals to prevent further spread of a contagious disease. The device 100 may also be used for disease screening in remote regions, where advanced laboratory equipments are scarce and limitation in disease diagnostic would delay treatment and could be potentially fatal for patients (e.g. in case of Ebola, Cholera, Malaria or Dengue outbreaks). Additionally, the device 100 may be used for diagnosis in case of diseases with overlapping clinical signs and symptoms (e.g. acute febrile diseases), or in case of zoonotic diseases (e.g. Brucellosis) to support One-Health paradigm.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

Zhou, Y., Wu, Y., Ding, L., Huang, X., & Xiong, Y. (2021), "Point-of-care COVID-19 diagnostics powered by lateral flow assay," *Trends in analytical chemistry: TRAC*, December 2021; 145: 116452. (https://doi.org/10.1016/j.trac.2021.116452)

Koczula, K. M., & Gallotta, A. (2016), "Lateral flow assays," *Essays in biochemistry,* 60(1), 111-120. (https://doi.org/10.1042/EBC20150012)

Wong, R. (2004), "Lateral Flow Contact Test Apparatus," U.S. Pat. No. 6,818,452 B2.

You et al. (2013), "Enclosed Unit for Rapid Detection of a Target Nucleic Acid Amplification Product," U.S. Pat. No. 8,415,141 B2.

Battrell et al. (2014), "Integrated Nucleic Acid Assays," U.S. Pat. No. 8,772,017 B2.

Egan et al. (2017), "Multianalyte Assay," U.S. Pat. No. 9,791,437 B2.

Dejohn, M., Cary, R. B., & Cobb, N. J. (2022), "Integrated Device for Nucleic Acid Detection and Identification," U.S. Pat. No. 11,268,142 B2.

Kayyem, J. F., Srinivasan, J., & Ford, S. (2013), "Integrated Multiplex Target Analysis," EP Patent No. 3427830 B1.

Deirmengian, C. et al. (2019), "System for Detecting Infection in Synovial Fluid," U.S. Patent No. 20190056391 A1.

Zhang, F., Gootenberg, J., Abudayyeh, O. (2020), "CRISPR Effector System Based Diagnostic," U.S. Patent No. 20200254443 A1.

Welch, N. L. et al., "Multiplexed CRISPR-based microfluidic platform for clinical testing of respiratory viruses and identification of SARS-CoV-2 variants," *Nature Medicine*, vol. 28, pp. 1083-1094 (2022). (https://doi.org/10.1038/s41591-022-01734-1)

What is claimed is:

1. A molecular point-of-care testing (POCT) diagnostic device for assaying a test sample, the device comprising:

a sample tube for receiving the test sample, the sample tube including a sample buffer for mixing with the test sample;

a microfluidic-based reaction tube insertable into the sample tube for receiving the sample buffer that is mixed with the test sample, the reaction tube including one or more reaction chambers installed at a first end portion of the reaction tube, an individual reaction chamber of the one or more reaction chambers being arranged to receive a portion of the received sample buffer, the individual reaction chamber including an amplification reagent for amplifying a test-sample content in the received portion to yield an amplified result used for assaying the test sample; and an inner tube configured to filter the sample buffer before the sample buffer reaches the reaction tube, the inner tube being connectable to the reaction tube such that the reaction tube receives the sample buffer from the sample tube via the inner tube;

wherein:

the reaction tube is configured to lock and seal the reaction tube and the sample tube together to create a closed enclosure confining the sample buffer for avoiding contamination of the sample buffer from outside the sample tube and the reaction tube during generation of the amplified result;

the individual reaction chamber is installed with a capillary tube configured to passively transport the portion of the received sample buffer from a second end portion of the reaction tube to the individual reaction chamber via a combination of capillary action and centrifugal acceleration induced by a manual inversion of the device, the second end portion being opposite to the first end portion;

the individual reaction chamber is further installed with a channel connecting the individual reaction chamber to the second end portion of the reaction tube;

the capillary tube is positioned inside the channel;

the reaction tube further includes a first O-ring located at a lateral side of the reaction tube as a static seal between the reaction tube and the sample tube to create the closed enclosure when the reaction tube is inserted into the sample tube, thereby preventing leakage to the external environment when the reaction tube is locked;

the reaction tube further includes a second O-ring located at the lateral side of the reaction tube for locking and sealing the reaction tube and the inner tube when the reaction tube is connected to the inner tube;

the reaction tube further includes a crevice gap located between the first and second O-rings for exposing respective channels installed for the one or more reaction chambers to outside the reaction tube;

one or more holes are formed on the channel at the crevice gap for displacing air in the individual reaction chamber during transfer of the sample buffer; and the crevice gap has an adjustable width for adjusting a volume of the portion of the received sample buffer to be transferred into the individual reaction chamber.

2. The device in accordance with claim 1, wherein the capillary tube is sealed with a heat-sensitive valve, the heat-sensitive valve being openable when exposed to heat.

3. The device in accordance with claim 1, wherein:

the one or more reaction chambers consist of four respective reaction chambers such that four respective channels are installed in the device; and the four respective channels are arranged in an X shape.

4. The device in accordance with claim 1, wherein the individual reaction chamber comprises a silicone seal enclosing a junction between the individual reaction chamber and the channel for sealing the junction.

5. The device in accordance with claim 1, wherein the inner tube is housed inside the sample tube when the reaction tube connected with the inner tube is inserted into the sample tube, and wherein the inner tube comprises:

an inner-tube opening for receiving the sample buffer from the sample tube; and a filter proximal to the inner-tube opening for filtering the sample buffer before the sample buffer reaches the reaction tube to thereby prevent possible cell debris from entering into the reaction tube.

6. The device in accordance with claim 1, wherein the amplification reagent is a dried amplification reagent.

7. The device in accordance with claim 1, wherein the one or more reaction chambers consist of four or more respective reaction chambers, the four or more respective reaction chambers being configured for simultaneous multiplex amplification of distinct targets.

8. The device in accordance with claim 1 further comprising a heating block for heating the reaction tube.

9. The device in accordance with claim 1 further comprising a reading cassette for assaying the amplified result, the reading cassette comprising:

a main body formed with a hollow tube used for receiving the reaction tube;

a lateral flow assay (LFA) strip housing for housing a LFA strip used to perform LFA;

a puncturing blade located at the hollow tube for rupturing the one or more reaction chambers when the reaction tube is inserted into the hollow tube, thereby releasing the amplified result from the one or more reaction chambers; and a glass fiber connecting the puncturing blade and the LFA strip housing for transporting the released amplified result to the LFA strip such that the test sample is assayed.

10. The device in accordance with claim 9, wherein:

the one or more reaction chambers consist of four respective reaction chambers; and the puncturing blade is shaped as a 4-point wide barbed arrowhead such that all the four respective reaction chambers are ruptured when the reaction tube is inserted into the hollow tube.

11. The device in accordance with claim 1, wherein a centrally-open plug is embedded into the channel, the centrally-open plug covering the channel and allowing the capillary tube to go through the channel so as to prevent uncontrolled spill of the sample buffer into the individual reaction chamber while allowing the portion of the received sample buffer to enter into the individual reaction chamber.

* * * * *